(12) United States Patent
Kopylov

(10) Patent No.: US 6,948,443 B1
(45) Date of Patent: Sep. 27, 2005

(54) FOLDING BOAT

(75) Inventor: Eduard Kopylov, 2335 S. Dawson Way, Aurora, CO (US) 80014

(73) Assignee: Eduard Kopylov, Aurora, CO (US)

( * ) Notice: Subject to any disclaimer, the term of this patent is extended or adjusted under 35 U.S.C. 154(b) by 0 days.

(21) Appl. No.: 11/043,557

(22) Filed: Jan. 26, 2005

(51) Int. Cl.$^7$ .............................................. B63B 7/00
(52) U.S. Cl. ..................................... 114/353; 114/352
(58) Field of Search ................................ 114/352–355

(56) References Cited

U.S. PATENT DOCUMENTS

| | | | |
|---|---|---|---|
| 3,042,942 A * | 7/1962 | Howe ......................... | 114/344 |
| 3,968,532 A * | 7/1976 | Bailey ........................ | 114/352 |
| 4,829,926 A * | 5/1989 | Voelkel .................... | 114/61.22 |
| 4,856,446 A * | 8/1989 | Herard ..................... | 114/61.22 |
| 5,803,007 A * | 9/1998 | Stevens ...................... | 114/266 |
| 6,345,581 B2 * | 2/2002 | Blanchard .................. | 114/61.1 |
| 6,755,142 B2 * | 6/2004 | Rice ........................... | 114/61.1 |
| 6,766,758 B1 * | 7/2004 | Zoss et al. ................. | 114/353 |

* cited by examiner

*Primary Examiner*—Jesus D. Sotelo

(57) ABSTRACT

A folding boat (11) with at least two foldable horizontal frames (12) each comprising at least two foldably connected sections (12A), (12B) in one said frame (12) and (12C), (12D) in another said frame (12).

Said sections are attached to each other by a transverse swivel joint (22) on one side and by releasable locking means (24) on another side. Said sections comprise two longitudinal rails (14) connected by a plurality of transverse members (16) and at least one swivelly foldable guard rail (26) with releasable locking means (32). Said longitudinal rails comprise internal (20) and external (18) longitudinal groves, where said internal longitudinal grooves hold a plurality of removable and stackable floats (46) with gasketed covers (48). Each said float comprises a substantially flat and vertical wall allowing said floats to be installed in pairs with mirror orientation to each other with their said flat and vertical walls contacting each other, so each pair of said floats forms a hydrodynamically shaped hull.

Said foldable horizontal frames are connected by a plurality of removable horizontal transverse beams (34) secured to said transverse members by beams releasable locking means (38). Said horizontal transverse beams comprise longitudinal tabs (36) which together with said external longitudinal grooves of said longitudinal rails support and hold in place removable deck sheets (44).

6 Claims, 8 Drawing Sheets

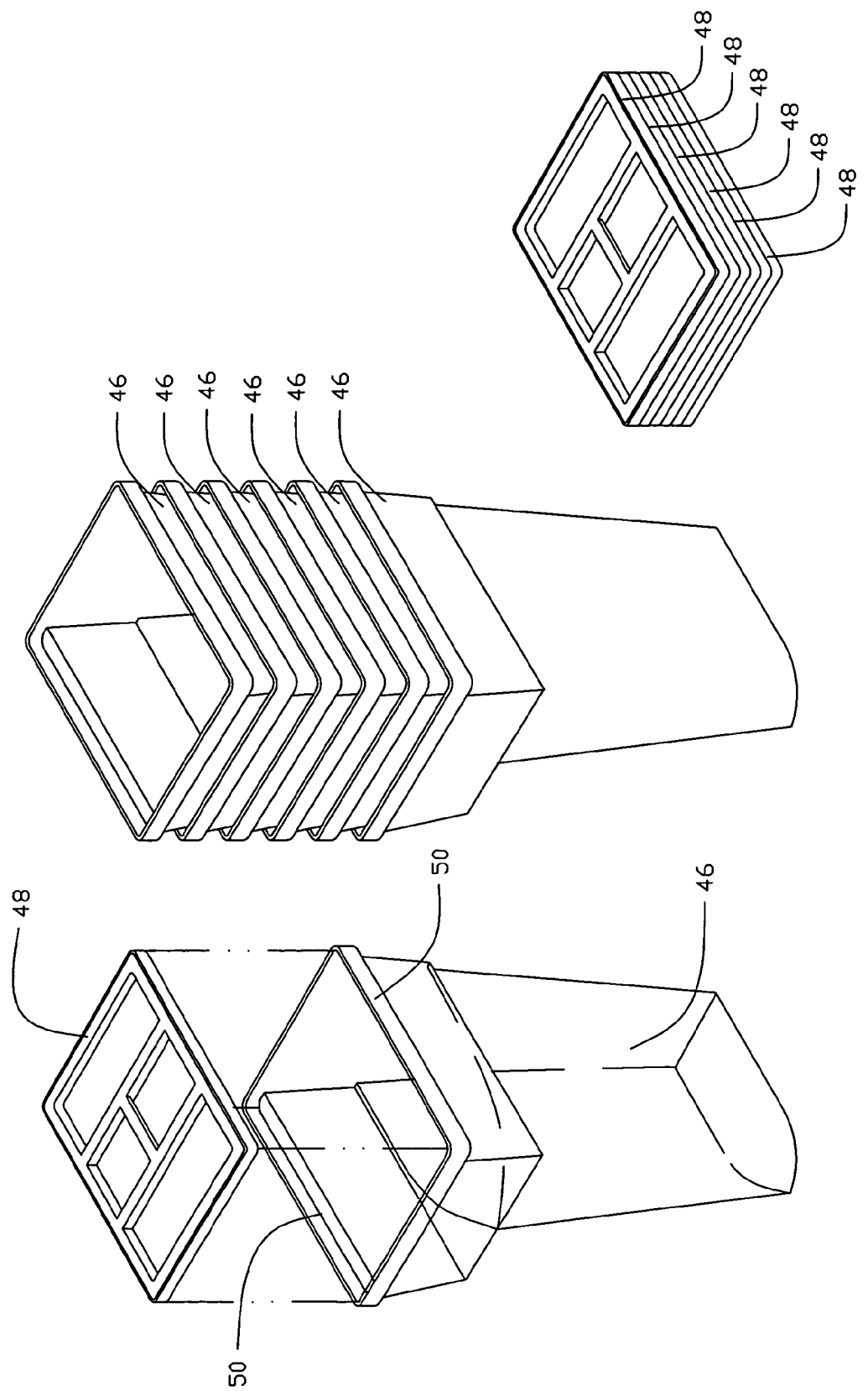

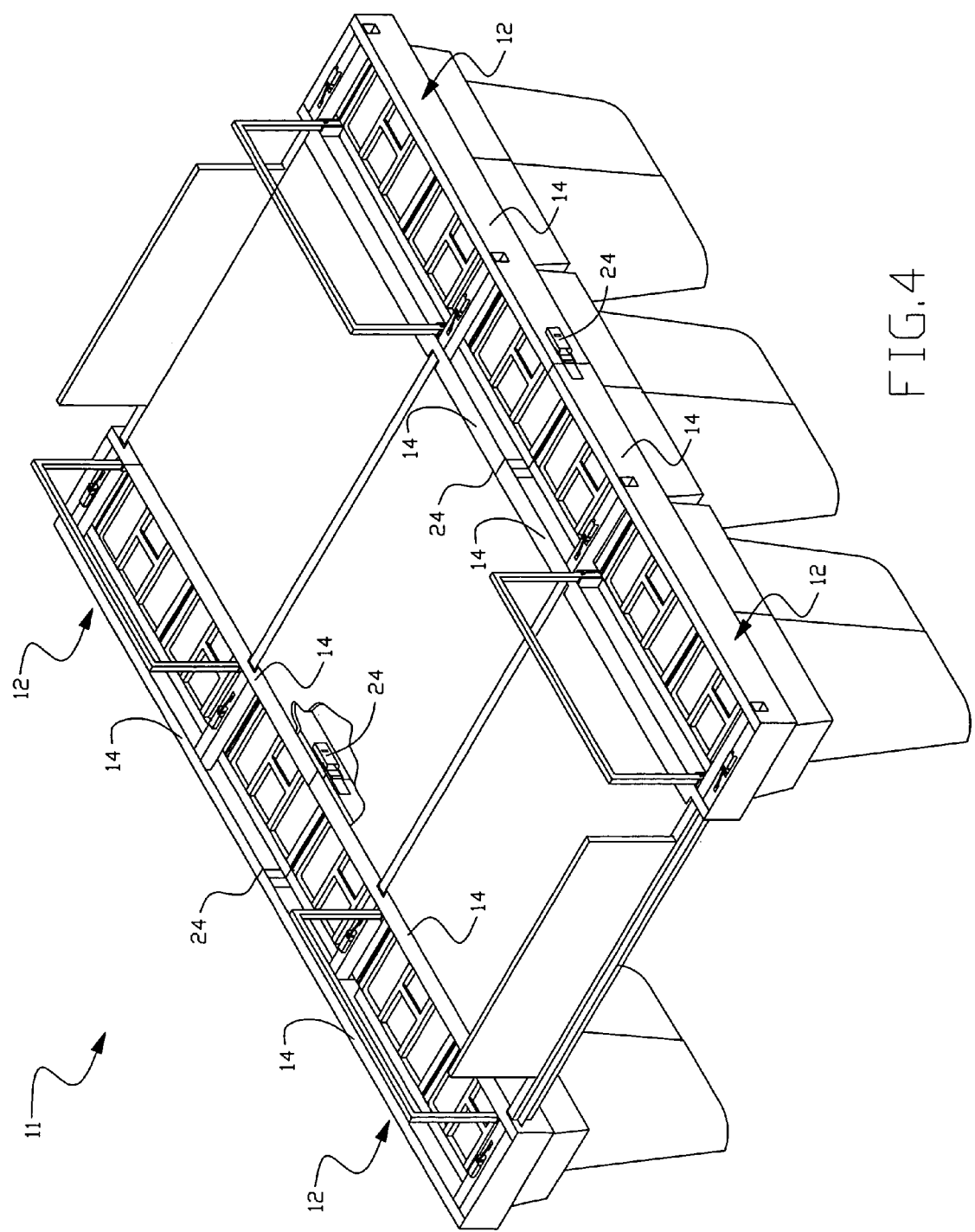

FOLDING BOAT

CROSS-REFERENCE TO RELATED APPLICATIONS

This application claims the benefit of Disclosure Document No. 559185 filed 2004 Aug. 13 by the present inventor.

FEDERALLY SPONSORED RESEARCH

Not Applicable

SEQUENCE LISTING OF PROGRAM

Not Applicable

BACKGROUND OF INVENTION—FIELD OF INVENTION

This invention relates to boats and more particular, to folding boats. There are several types of folding boats on the market: rigid structure type, inflatable type and combination of both types mentioned above.

Inflatable boats depend upon ability to maintain air pressure and are extremely vulnerable to puncture.

Rigid structure boats offer significant advantages in terms of comfort, reliability and stability, however, existing rigid structure folding boats are too heavy to handle in folding and unfolding process and are not sufficiently compact and versatile in their folded configuration. They do not offer sufficient flotation redundancy or construction integrity. They often require a trailer for their transportation or, at the best, a track bed or luggage rack on a vehicle.

It is understood that there is a real demand for a compactly folding boat combining advantages of a rigid structure, flotation redundancy, simplicity and lightness in folding and unfolding process, compactness and versatility in folded configuration.

There is need for a folding boat requiring small storage area with ability to be transported in a station wagon, in a minivan or in a sport-utility vehicle.

BACKGROUND OF INVENTION—PRIOR ART

The folding boat offered by Strausser in U.S. Pat. No. 3,056,147 comprises a foldable lengthwise hull with two large seams which are prone to leaking. I addition to that, the boat lacks any redundant flotation means and full hull length in the folded configuration creates difficulties of storage and transportation.

The portable, foldable and collapsible water cycle disclosed by Liard in U.S. Pat. No. 3,257,987 can be folded along the longitudinal axis of the hull creating long package which would be difficult to transport or store.

The pontoon boat having a collapsible form presented by Voelkel in U.S. Pat. No. 4,829,926 comprises two full length pontoons with collapsible Structure on a top of them. Full length pontoons are bulky and take too much Space, even in the folded configuration.

The folding fishing boat apparatus disclosed by Lesly in U.S. Pat. No. 5,052,324 comprises two full length pontoons which are not allowing compact folded configuration.

The portable pontoon boat presented by Evans in U.S. Pat. No. 5,237,954 comprises four pontoons and removable structure above them. Such arrangement presents some improvements, however, bolted half shells construction of the pontoons are prone to leaking and require complex assembly and disassembly process.

The modular pontoon deck disclosed by Stevens in U.S. Pat. No. 5,803,007 comprises plurality of modular floats connected to a modular achieve compact folding, however, it is too complicated and plurality of the modular floats still would occupy too much space in folded configuration, so it would be difficult to transport a such boat in a station wagon, minivan or sport-utility vehicle.

The collapsible trailerless pontoon boat offered by Little in U.S. Pat. No. 6,067,925 comprises four pontoons and foldable platform. This idea failed to provide compact folded configuration due to the bulky pontoons. In addition to that, the system is too complicated and expensive to manufacture.

The collapsible boat transport system offered by Brignolio in U.S. Pat. No. 6,647,913 is three full length pontoon configuration with folding ability to reduce distance between pontoons. This is bulky boat suggested for trailer transportation with very modest reduction of size in folded configuration.

The folding boat disclosed by Zoss et al. in U.S. Pat. No. 6,766,758 comprises four pontoons and pivotally folded deck panels.

Such folding arrangement does not produce compact folding configuration suitable for transportation in medium size vehicles. I addition to that, this boat is too bulky to handle it by a one person.

BACKGROUND OF INVENTION—OBJECTS AND ADVANTAGES

Accordingly, besides the objects and advantages of the folding boat described in my Patent several objects and advantages of the present invention are:

a. To provide a rigid structure folding boat which being in folded configuration would feet inside of most medium size station wagons, minivans, sport-utility vehicles and would be easy to store indoors.

b. To provide a folding boat which would have simple and quick assembly and disassembly process without tools, loading and unloading by a one person.

c. To provide a folding boat with reliable and redundant flotation capabilities.

d. To provide a folding boat which would be easy and inexpensive to manufacture.

e. To provide a folding rigid structure boat where some elements of it could be utilized for other than flotation purposes.

f. To provide a folding boat which would easily used with muscular, wind or solar-electric propulsion systems.

SUMMARY

The apparatus of the present invention overcomes the above-mentioned disadvantages and drawbacks that are characteristic of these aforementioned designs. More particularly, a preferred embodiment of the present invention comprises a foldable boat apparatus that is easy to assembly into operational mode, easy to transport and to store.

In a preferred embodiment, the folding boat comprises at least two foldable horizontal frames each comprising at least two fold ably connected sections with longitudinal rails equipped with internal and external longitudinal grooves.

Said longitudinal rails are interconnected by a plurality of transverse members of said foldable horizontal frame.

Said fold ably connected sections of each said foldable horizontal frame can be attached to each other by a transverse swivel joint on one side of said foldable horizontal frame and by releasable locking means on another side of the same foldable horizontal frame.

Also, said fold ably connected sections of the same foldable horizontal frame can be attached to each other by said releasable locking means on each side of said foldable horizontal frame.

A plurality of removable horizontal transverse beams connect said foldable horizontal frames of the boat in unfolded configuration.

Said removable horizontal transverse beams can be engaged with said horizontal transverse members of each said foldable horizontal frame structurally connecting both said frames.

Releasable locking means installed on each said transverse member can hold both ends of said horizontal transverse beams in engaged position. Said horizontal transverse beams are equipped with longitudinal tabs.

Plurality of deck sheets can be supported and held by said external grooves of said longitudinal rails and supported by said longitudinal tabs of said removable horizontal transverse beams.

Each said foldable horizontal frame hold plurality of removable and stackable floats.

Each said float comprises a removable and stackable gasketted cover. Each said above float can be equipped with horizontal longitudinal tabs which can be engaged with said internal longitudinal grooves of said longitudinal rails.

Said floats covers can be attached to the said float by a releasable locking means or can be extended to the vertical longitudinal walls of said float tabs to be held by said internal longitudinal grooves of said longitudinal rails.

Said floats can be two types of configurations: for individual installation or paired installation.

Each float designed for paired installation comprises flat vertical wall which allows to install them in a mirror orientation with their vertical walls contacting each other, so, said pair of floats forms one a hydro-dynamically shaped hull.

Said removable horizontal transverse beams located at the front or at the rear of the boat can be equipped with a transom plate.

Said folding boat can be used with muscular, wind and solar-electric propulsion.

In the folding process of the inventive boat the releasable locking means of the removable transverse beams to be released and said removable transverse beams moved out of said transverse members of foldable horizontal frame allowing to lift said removable deck sheets out of the boat. Further, said removable transverse beams being fully disengaged from said transverse members leaving said foldable horizontal frames with mounted said floats. Than, releasable locking means of said foldable horizontal frame being released allow said floats to be removed from the frame by sliding them out of the internal longitudinal grooves of the longitudinal rails being positioned for removal of the floats.

Swively foldable guard rails mounted on said foldable horizontal frames can be swively folded with prior release of guard rail releasable locking means. In the folded configuration the guard rails would assume a position substantially coplanar with the top surface of said foldable horizontal frame.

The covers of said floats to be removed and stacked allowing the floats to be stacked in compact stack.

At the end of the folding process the inventive boat to be reduced to the compact stack of the floats, stack of the float covers, stack of the deck sheets, the folded horizontal frames and detached said horizontal transverse beams.

At least two removable wheeled shoes can be attached to the boat floats to allow easy launching of the boat.

Some elements of the folded boat can be utilized for the purposes different from flotation. For instance, the floats can be used as storage bins, the foldable horizontal frame and the deck sheets can be utilized as structural elements for variety of different useful purposes.

Also, substantially rectangular plan view configuration of said foldable horizontal frames of the inventive boat allow to connect a plurality of such boats to each other in a horizontal longitudinal direction to form larger floating platform.

DRAWINGS—FIGURES

FIG. 2 Shows isometric view of a removable and stackable float with the float cover being removed.

FIG. 3 Shows isometric view of a removable and stackable floats being assembled in a stack.

FIG. 3A Shows isometric view of the floats removable and stackable covers being assembled in a stack.

FIG. 4 Shows isometric view of the inventive boat with paired floats and detachably foldable horizontal frame.

Figure 7:
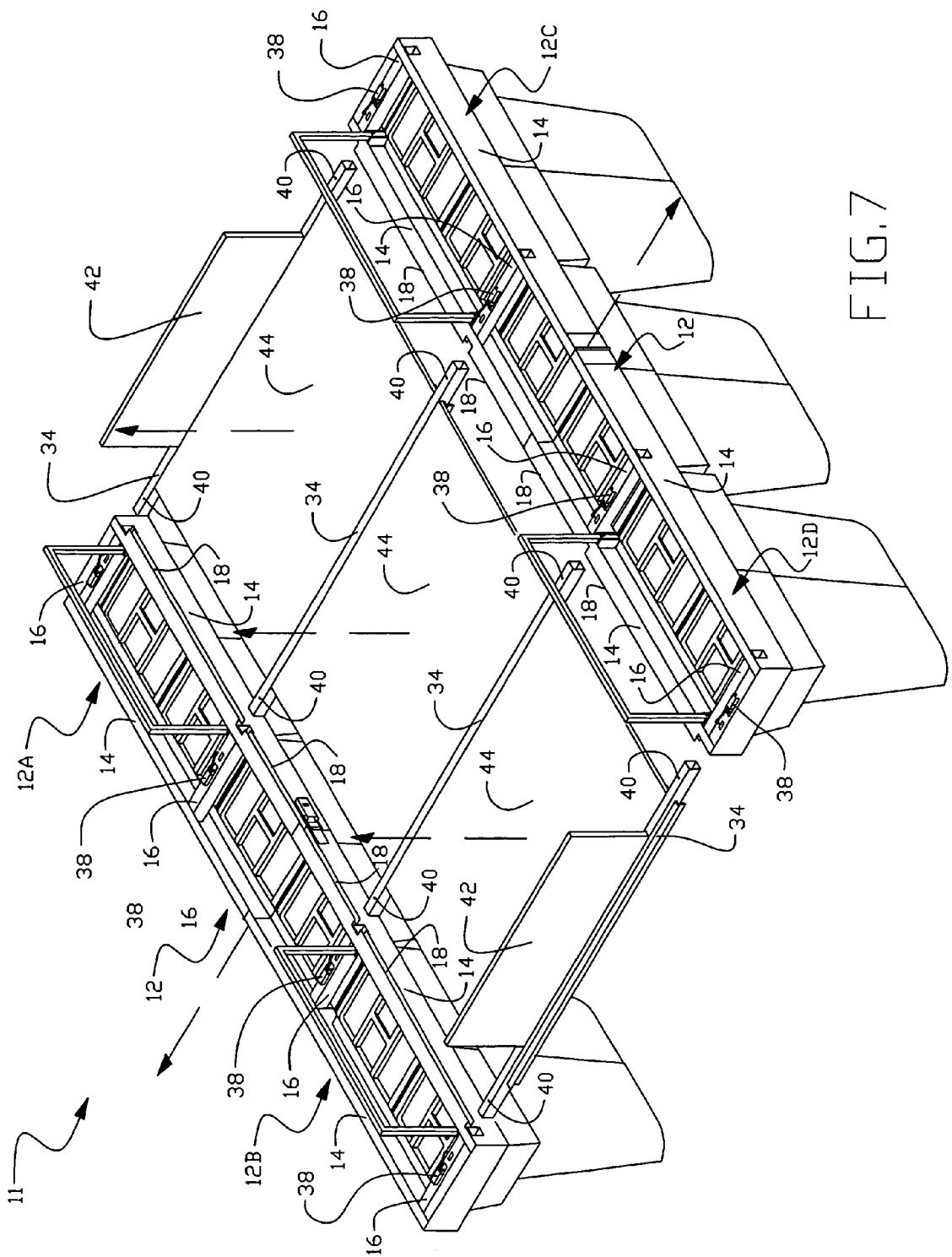

FIG. 7 Isometric view of the inventive boat being in process of disassembly (with the horizontal transverse beams and the deck sheets to be removed).

Figure 8:
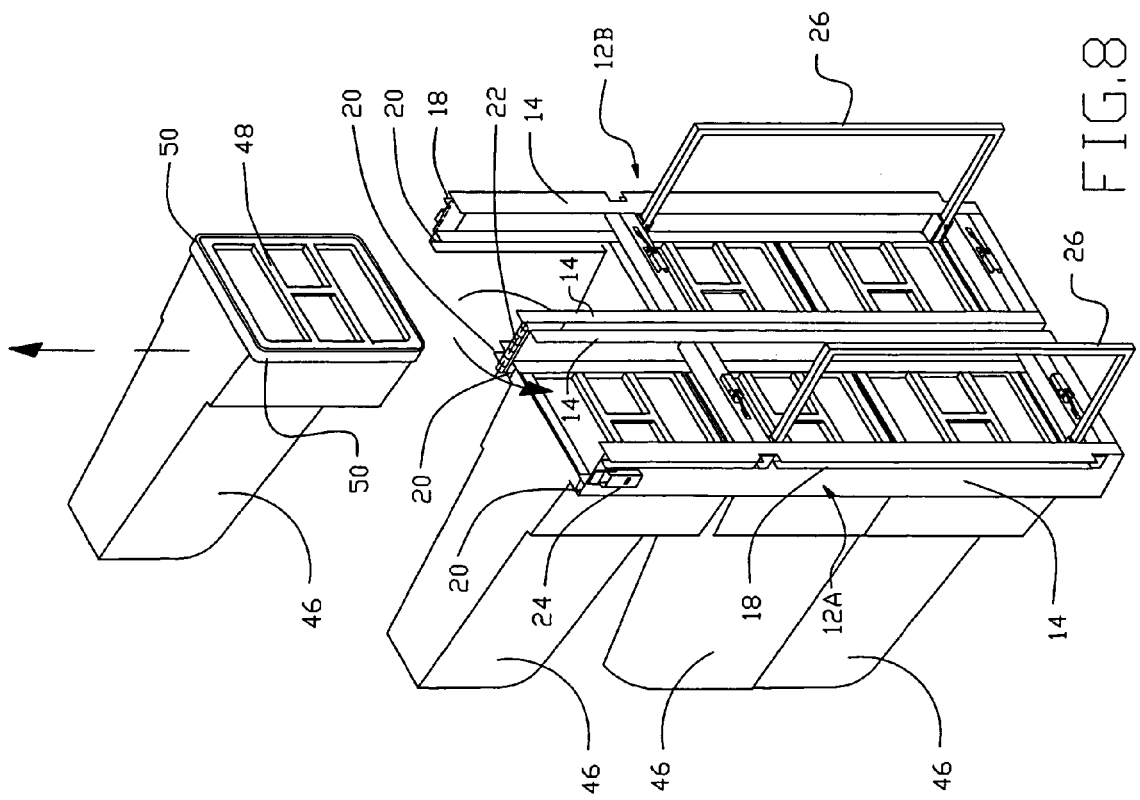

FIG. 8 Shows isometric view of a swively folded horizontal foldable frame of the inventive boat with floats being in process of removal.

Figure 9:
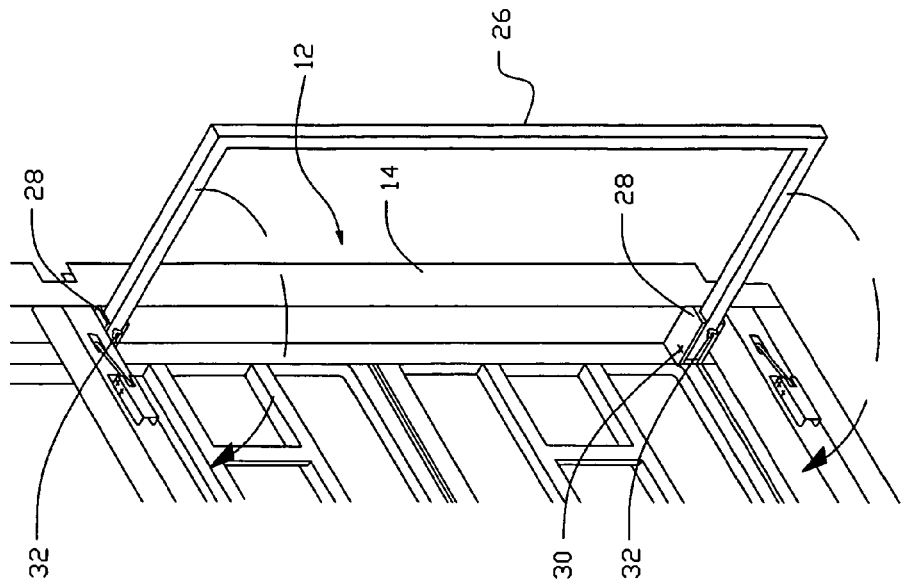

FIG. 9 Shows isometric view of a swively foldable guard rail.

Figure 10:
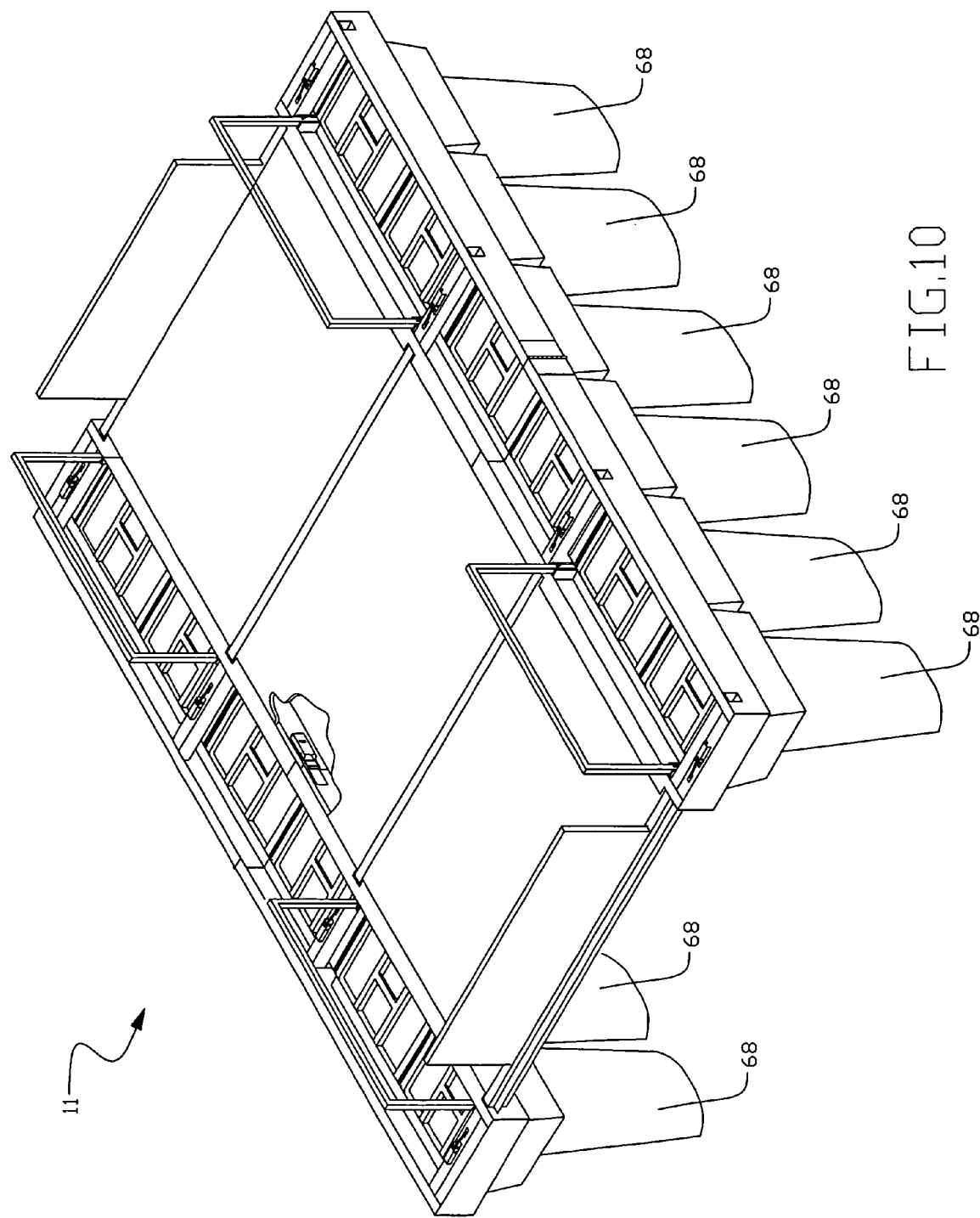

FIG. 10 Shows isometric view of the inventive boat with individual floats.

DRAWINGS—REFERENCE NUMERALS

11—Inventive folding boat frame section
12—Foldable horizontal frame
12A—Foldable horizontal frame section
12B—Foldable horizontal frame section
12C—Foldable horizontal frame section
12D—Foldable horizontal frame section
14—Longitudinal rail of the foldable horizontal frame
16—Transverse member of the foldable horizontal frame
18—External longitudinal groove of the longitudinal rail
20—Internal longitudinal groove of the longitudinal rail
22—Transverse swivel joint of the foldable horizontal frame
24—Releasable locking means of the foldable horizontal frame
26—Swively foldable guard rail
28—Holding bracket of the guard rail
30—Transverse swivel joint of guard rail
32—Releasable locking means of the guard rail
34—Removable horizontal transverse beam
36—Longitudinal tab of the horizontal transverse beam 38—Releasable locking means of the horizontal transverse beam
40—Transverse beam keyhole for the releasable locking means
42—Transom plate
44—Removable deck sheet
46—Removable and stackable float
48—Removable and stackable gasketted cover of the float
50—Horizontal longitudinal tab of the float
52—Folding armchair
54—Releasable locking means of the armchair
56—Removable electric trolling motor
58—Rechargeable electric battery
60—Removable holding tray for the battery
62—Releasable locking means for the battery holding tray
64—Removable photovoltaic array solar panel
66—Releasable locking means for the solar panel
68—Removable and stackable float individually mounted style
70—Removable wheeled shoe for launching the boat

DETAILED DISCLOSURE OF PREFERRED EMBODIMENTS

Although specific features of the invention are shown in some drawings and not others, this is for convenience only as each feature may be combined with any or all of other features in accordance with the invention.

While preferred illustrative embodiments of the invention are described Above, it will be apparent to those skilled in the art that various changes and modifications may be made without departing from the invention.

The appended claims are intended to cover all changes within the spirit of the invention.

A preferred embodiment of the inventive folding boat is illustrated in FIGS. 1–10.

Figure 1:
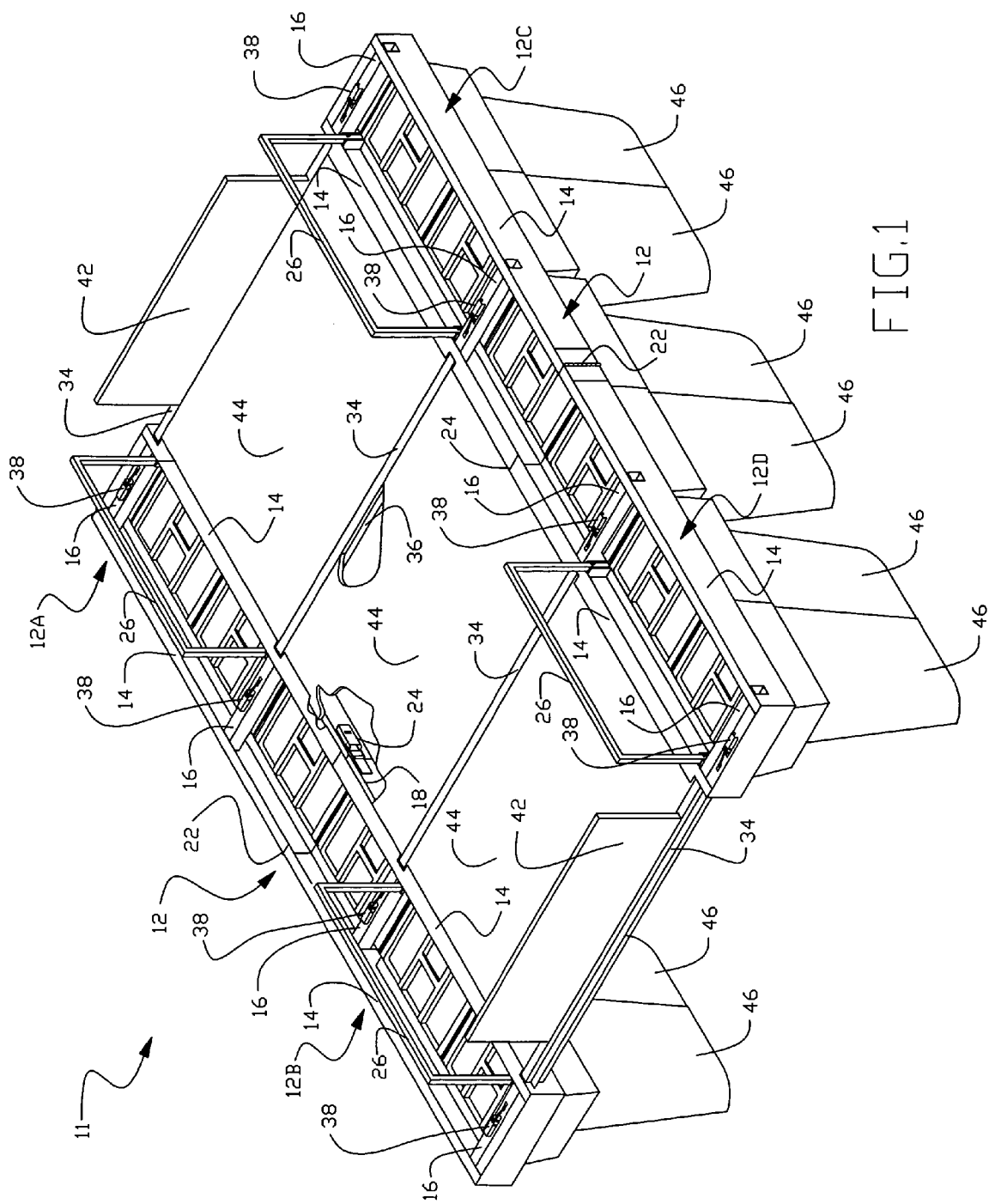
FIG. 1 Shows isometric view of the inventive boat with paired floats and swively foldable horizontal frame.

Referring now to FIG. 1, which is an isometric view of the inventive boat 11 in unfolded configuration. The boat comprises at least two foldable horizontal frames (12) with at least two fold ably connected sections (12A), 12B in one said frame (12) and with at least two fold ably connected section (12C), (12C) in another said frame (12). Each said section of said foldable horizontal frames consist of two parallel longitudinal rails (14) which are interconnected by transverse members (16).

Said fold ably connected sections (12A) and (12B) of said one foldable horizontal frame are attached to each other by at least one transverse swivel joint (22) on one side of said foldable horizontal frame (12) and by at least one releasable locking means (24) on another side of the same frame.

Said fold ably connected sections (12C) and (12D) of said another foldable horizontal frame are attached to each other by at least one of the same type of swivel transverse joint (22) on one side of another said foldable horizontal frame (12) and by at least one of the same type of releasable locking means (24) on another side of this frame.

As can be seen on the drawing said transverse swivel joints connect outer said longitudinal rails (14) of each foldable horizontal frame (12) and said releasable locking means (22) connect inner said longitudinal rails (14) of each horizontal foldable frame (12).

Said releasable locking means (24) and transverse swivel joint (22) being of the usual conventional design, old in the art, and well known in structure and methods of operation to those skilled in the art, they are therefore simply indicated, and the details of structure and operation of them are omitted.

At least one swivelly foldable guard rail (26) is mounted on each said fold ably connected section (12A), (12B), (12C), (12D) of said foldable horizontal frame (12).

Removable horizontal transverse beams (34) connect said foldable horizontal frames (12) of the boat (11) engaging respective said transverse members (16).

Transverse beam releasable locking means (38) being installed on said transverse members (16) holds said transverse member (16) and said horizontal transverse beam (34) in engaged position.

Said releasable locking means (38) being of the usual conventional design, old in the art, and well known in structure and methods of operation to those skilled in the art, it is therefore simply indicated, and the details of structure and operation of it are omitted.

A transom plate (42) can be attached to said horizontal transverse beam (34) at the front or at the rear of the boat.

Two opposite edges of removable deck sheets (44) are supported by longitudinal tabs (36) of said horizontal transverse beams (34) and other two edges are engaged and supported by external longitudinal grooves (18) of said inner longitudinal rails (14).

Plurality of removable and stackable floats (46) are release ably attached to said foldable horizontal frames (12). Said floats (46) can be installed in pairs in mirror orientation with their vertical flat walls contacting each other, so, said pair of floats forms one hydro-dynamically shaped body.

Referring to FIG. 2 which is an isometric view of the preferred embodiment of the removable and stackable float (46) with lifted up a removable and stackable gasketted cover (48). As can be seen, rear wall of the float (46) is substantially flat and vertical and can be utilized in paired installation as mentioned in the description of FIG. 1.

Horizontal longitudinal tabs (50) of the float (46) allow the float to be attached to the longitudinal rails (14) which have been mentioned in the description of FIG. 1 and to be shown in detail in further drawings.

Referring to FIG. 3 which is an isometric view of the removable and stackable floats (46) assembled in a stack. This is simple and compact method to transport and store the floats.

Referring to FIG. 3A which is an isometric view of the removable and stackable gasketted covers (48) assembled in a stack.

Referring to FIG. 4 which is an isometric view of the inventive boat (11), the same as presented in FIG. 1, but with different connections style of the longitudinal rails (14). The both sides of each said foldable horizontal frame (12) are connected by said releasable locking means (24) allowing said foldable horizontal frame sections (12A), (12B), (12C), (12D) to be completely detached from each other in the boat folding process.

Figure 5:
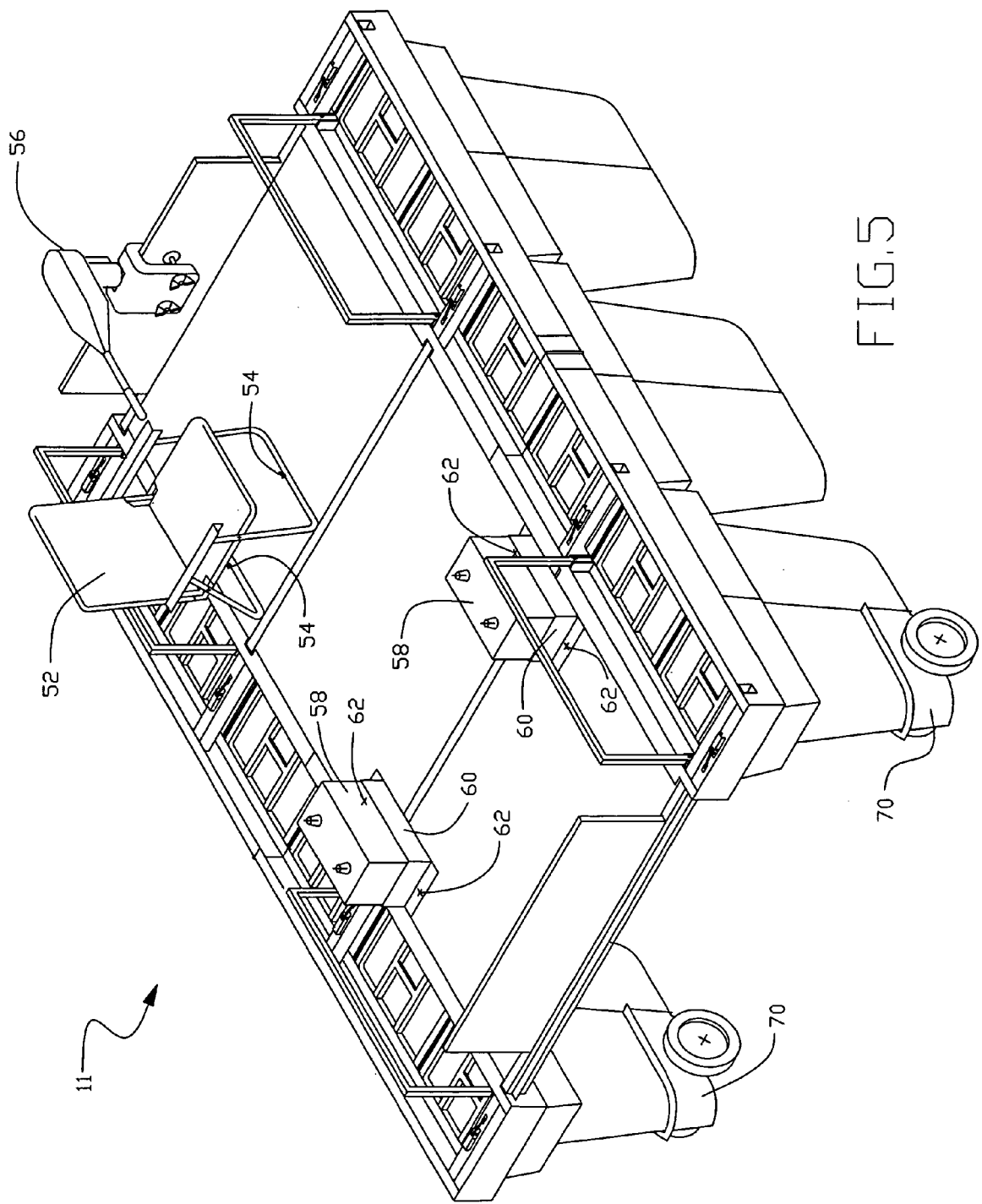
FIG. 5 Shows isometric view of the inventive boat equipped with a folding armchair, and electric propulsion system.

Referring to FIG. 5 which is an isometric view of the inventive boat (11) equipped with a folding armchair (52) being attached to the boat by releasable locking means (54), a removable electric trolling motor (56), electric rechargeable batteries 58 installed in removable battery trays (60) which are attached to the boat by releasable locking means (62).

Said releasable locking means (54), (62) and an electric propulsion system being of the usual conventional design, old in the art, and well known in structure and methods of operation to those skilled in the art, they are therefore simply indicated, and the details of structure and operation of them are omitted.

A removable wheeled shoes (70) can be put on the boat floats, as shown, to simplify moving or launching the unfolded inventive boat by a one person.

The rechargeable batteries (58), the removable electric trolling motor (56) (heavy components) can be installed after the boat launching is complete or these said heavy components to be removed before installing said wheeled shoes (70) to move the boat.

Figure 6:
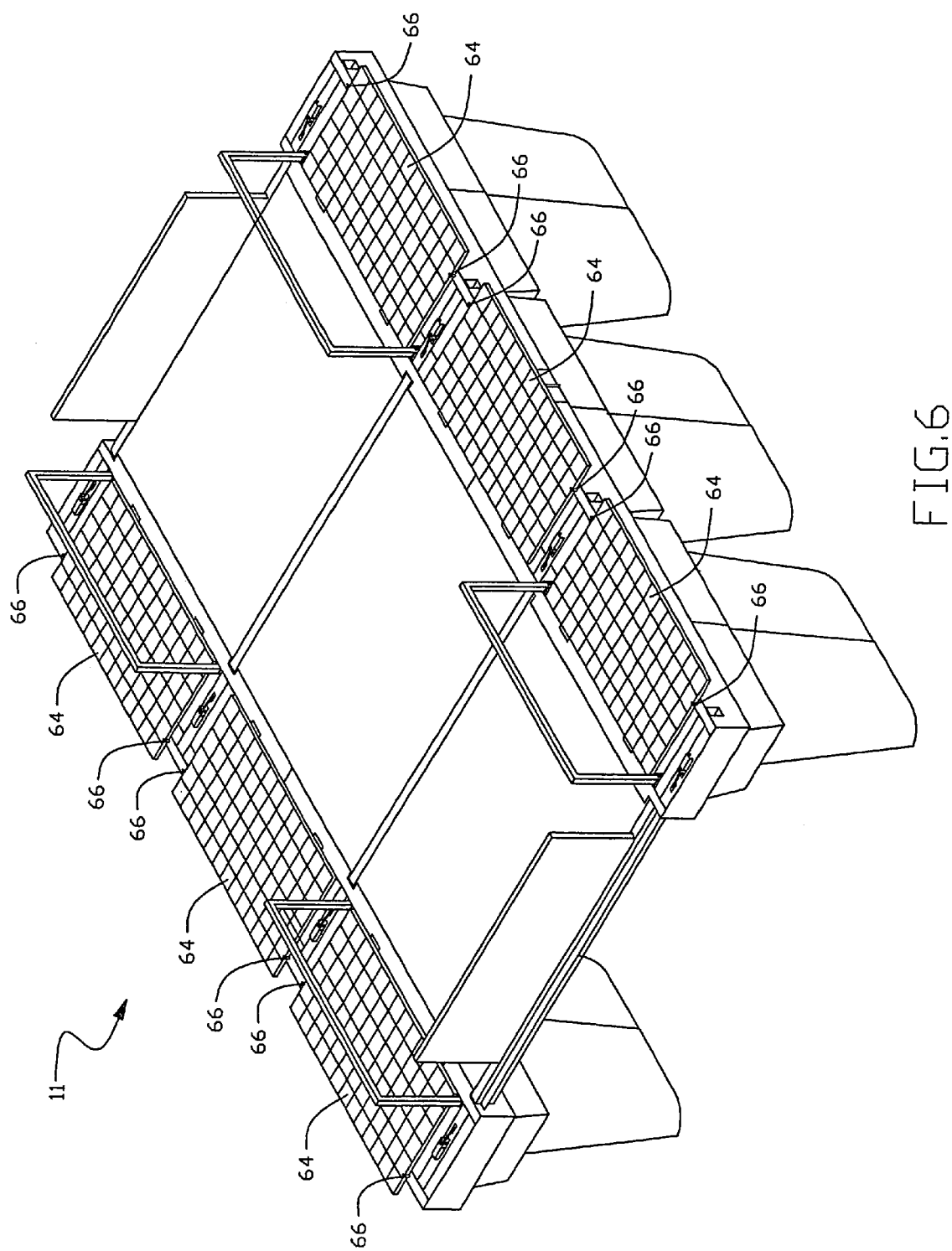
FIG. 6 Shows isometric view of the inventive boat equipped with removable photovoltaic array panels.

Referring to FIG. 6 which is an isometric view of the inventive boat (11) equipped with removable photovoltaic solar array panels (64) being attached to the boat by releasable locking means (66).

Said releasable locking means (66) and said solar panels powered electric propulsion system being of the usual conventional design, old in the art, and well known in structure and methods of operation to those skilled in the art, they are therefore simply indicated, and the details of structure and operation of it are omitted.

Referring to FIG. 7 which is an isometric view of the inventive boat (11) being in the first stages of the folding process. The releasable locking means (38) of the horizontal transverse beams being released allow said removable horizontal transverse beams (34) to be disengaged from their respective transverse members (16) of the fold ably connected sections (12A), (12B) of the foldable horizontal frame (12) on one side of the boat and (12C), (12D) on another side of the boat by pulling apart said foldable horizontal frames (12) in the horizontal transverse direction.

Transverse beam keyholes (40) of the releasable locking means (38) are shown at the each end of the horizontal transverse beams (34).

In the first stage of the pulling process, said horizontal transverse beams (34) being partially pulled out of said transverse members (16) release longitudinal edges the deck sheets (44) from the external longitudinal grooves (18) of the longitudinal rails 14 allowing removal of said deck sheets (44) from the boat.

After removal of the deck sheets (44) said foldable horizontal frames (12) can be moved further apart in the same horizontal transverse direction until said horizontal transverse beams (34) are fully disengaged from said transverse members (16) and removed.

Referring now to FIG. 8 which is an isometric view of the fold ably connected sections (12A), (12B) of one side of the inventive boat in folded configuration.

The releasable locking means (24) of the foldable horizontal frame connecting the longitudinal rails (14) of the fold ably connected sections (12A), (12B) have been released.

Said fold ably connected sections (12A) and (12B) being rotated 180 degrees in relation to each other around their connecting transverse swivel joint (22) assume substantially parallel orientation in relation to each other allowing the removable and stackable floats (46) to be slide ably removed from the internal longitudinal grooves (20) of the longitudinal rails (14).

The drawing shows the float (46) being removed from the fold ably connected frame section (12B) comprises the horizontal longitudinal tabs (50) and the removable and stackable gasketted cover (48) forming top surface of said tabs (50) so, said internal longitudinal grooves (20) hold both said float (46) and said cover (48) together when said float 46 was attached to said foldable horizontal section (12B).

The folding configuration and process depicted in FIG. 8 is typical for both said foldable horizontal frames (12) of the inventive boat.

The drawing offers good view of the external longitudinal grooves (18) used to support and hold longitudinal edges of the removable deck sheets (44) shown in FIG. 1, FIG. 7.

Additionally, it shall be understood that the transverse swivel joint (22) can be replaced by a releasable locking means, similar to the releasable locking means (24) as was, also, shown in FIG. 4. Such arrangement will allow said fold ably connected frame sections (12A), (12B), (12C), (12D) to be separated in the folded configuration.

Referring to FIG. 9 which is an isometric view of the swivelly foldable guard rail (26) being attached to guard rail holding brackets (28) by guard rail transverse swivel joints (30). Said holding brackets (28) are mounted on the longitudinal rail (14) of the foldable horizontal frame (12).

In the folding process guard rail releasable locking means (32) to be released allowing the guard rail (26) to be swively folded to assume a folded position which is substantially coplanar with the top surface of said foldable horizontal frame section (12).

Said releasable locking means (32) and transverse swivel joint (30) being of the usual conventional design, old in the art, and well known in structure and methods of operation to those skilled in the art, it is therefore simply indicated, and the details of structure and operation of it are omitted.

Referring to FIG. 10 which is an isometric view of the inventive boat (11) as shown in FIG. 1 except it is equipped with removable and stackable floats are of individually mounted style (68).

Arrangement of said float (68) is similar to the float (46) except the float (68) has individual hydro-dynamically shaped style comparing with the floats (46) which are designed to form hydro-dynamical shape when they are installed in a mirror oriented pair.

I claim:

1. A folding boat with at least two foldable horizontal frames each comprising at least two foldably connected sections attached to each other by a transverse swivel joint on one side and by releasable locking means on another side, wherein said foldably connected sections comprise two substantially parallel longitudinal rails connected by a plurality of transverse members and at least one swivelly foldable guard rail with releasable locking means, further, said longitudinal rails comprise internal and external longitudinal grooves, wherein said internal longitudinal grooves hold a plurality of removable and stackable floats each float equipped with a removable and stackable gasketted cover and horizontal longitudinal tabs, wherein each said float comprises a substantially flat and vertical wall allowing said floats to be installed in pairs with mirror orientation to each other with their said flat and vertical walls contacting each other, so each pair of said floats forms a hydro-dynamically shaped hull, and further, said foldable horizontal frames are connected by a plurality of removable horizontal transverse beams which are secured to said transverse members of said foldable horizontal frames by beam releasable locking means, wherein said horizontal transverse beams comprise longitudinal tabs, such that longitudinal edges of removable deck sheets of the boat are held in place and supported by said external longitudinal grooves of said longitudinal rails and transverse edges of the same deck sheets are supported by said longitudinal tabs of said transverse horizontal beams, such that, in the boat folding process said beam releasable locking means can be released allowing detachment of said horizontal transverse beams and deck sheets from the boat, and further, said foldably connected sections of said foldable horizontal frames can be swivelly folded with prior release of their said releasable locking means allowing removal of said removable and stackable floats from said internal grooves of said longitudinal rails of said sections of said foldable horizontal frames and further, said swivelly foldable guard rails can be swivelly folded with prior release of said guard rail releasable locking means, so said swivelly foldable guard rails assume folded position substantially coplanar with top surface of said sections of said foldable horizontal frames.

2. The folding boat of claim 1 wherein in said fold ably connected sections of said each foldable horizontal frame are connected by said releasable locking means on both sides of each said foldable horizontal frame allowing total detachment of said sections in the folding process.

3. The folding boat of claim 1 wherein said removable and stackable floats are attached to said foldable horizontal frame individually and have individual hydro-dynamically shaped hull.

4. The folding boat of claim 1 wherein said folding boat is equipped with solar photovoltaic array panels.

5. The folding boat of claim 1 wherein said removable horizontal transverse beams located at the front or rear of the boat are equipped with transom plates.

6. The folding boat of claim 1 wherein said folding boat is equipped with at least one removable electric trolling motor, at least one rechargeable battery with a removable holding tray, at least one removable folding armchair and at least one pair of removable wheeled shoes for launching the boat.

* * * * *